A. G. WRIGHT.
DENTAL AMALGAM MACHINE.
APPLICATION FILED OCT. 25, 1919.

1,369,209.

Patented Feb. 22, 1921.
2 SHEETS—SHEET 1.

WITNESS:

INVENTOR
Alfred G. Wright.
BY
Augustus B. Stoughton
ATTORNEY.

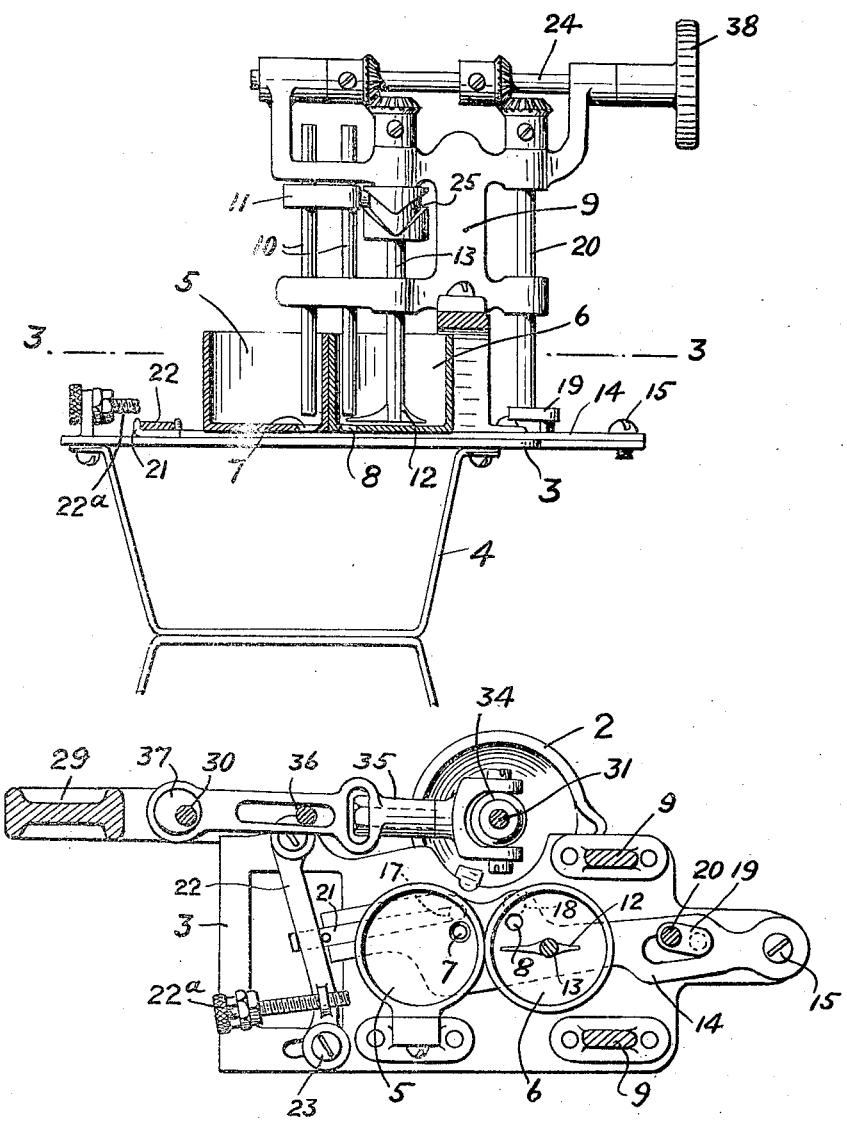

UNITED STATES PATENT OFFICE.

ALFRED G. WRIGHT, OF PHILADELPHIA, PENNSYLVANIA.

DENTAL AMALGAM-MACHINE.

1,369,209.  Specification of Letters Patent.  Patented Feb. 22, 1921.

Application filed October 25, 1919. Serial No. 333,326.

*To all whom it may concern:*

Be it known that I, ALFRED G. WRIGHT, a citizen of the United States, residing at Philadelphia, in the county of Philadelphia and State of Pennsylvania, have invented a certain new and useful Dental Amalgam-Machine, of which the following is a specification.

The principal object of the present invention is to provide a comparatively inexpensive, simple, compact and reliable hand machine, suitable for use by dentists in their offices and in the course of their practice and adapted, automatically, to accurately measure the ingredients of amalgams and to rapidly mix them into the form of an amalgam ready for use.

The invention will be claimed at the end hereof but will be first described in connection with the embodiment of it selected for illustration in the accompanying drawings forming part hereof and in which—

Fig. 2, is a similar view of parts of the machine detached, and

Fig. 3, is a top or plan view, partly in section, on the line 3—3 of Fig. 2.

Figure 1:
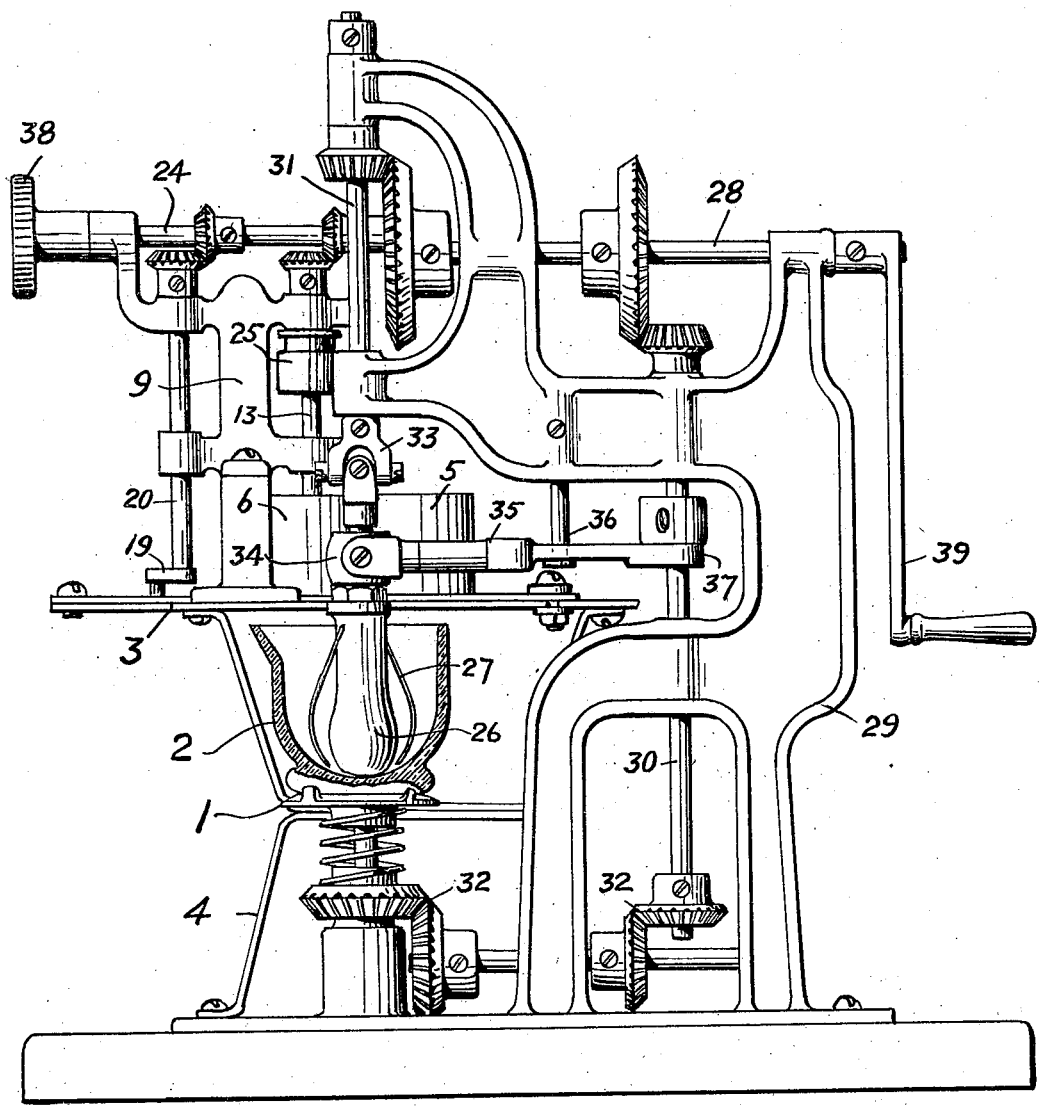
Figure 1, is a side view, partly in section, of a machine embodying features of the invention.

In the drawings 1, is a spring pressed rotary mortar carrier and 2, is a mortar detachably mounted on the carrier 1, for rotation therewith. 3, is a table carried by the base for example, by means of legs 4. 5 and 6, are cups respectively for mercury or quick silver and the other ingredients of the amalgam which will be called metal powder and they are arranged above the table 3, and have outlets 7, and 8, through their bottoms. 9, is a frame that may be mounted on the table 3, and availed of for supporting the cups above the table. 10, are feed plungers for the outlets 7 and 8, and they are shown as depending from the cross head 11, slidable on the frame 9. 12, is a rotary distributer for the metal powder cup 6, and it is shown as mounted on the end of a cam shaft 13, revoluble in the frame 9. 14, is a feed plate oscillatable about a pivot 15, between the cups 5 and 6, and the table 3, and it is provided with openings 17 and 18, which are brought by its oscillation into line with the outlets 7 and 8, to receive material fed by the plungers 10, and over the mortar 2, to discharge the ingredients into it. The feed plate 14, is oscillated by a crank arm 19, and crank shaft 20, revolubly mounted in the frame 9. 21, is a reciprocating slide on the feed plate 14, and one end of it constitutes a wall of the opening 17, for mercury so as to enlarge the opening and insure the discharge of the mercury into the mortar 2. 22, is a cam bar for working the slide 21, and the inclination of this bar 22, can be adjusted by the screw 22ª, and clamp nut 23, to increase or diminish the throw of the slide and so regulate the mercury feed. A hand-shaft 24, mounted in the frame 9, through bevel gearing drives the shafts 13 and 20, and the shaft 13, is provided with a cam 25, that works the cross head 11. 26, is a pestle provided with stirrers 27, and it is mounted for rotation about its own axis and for gyratory movement in the mortar 2. The crank shaft 28, mounted in the standard 29, through bevel gearing drives the counter shaft 30, and pestle shaft 31, and so rotates the pestle about its own axis. The counter shaft 30, through bevel gearing 32, turns the mortar carrier and mortar in the opposite direction to the direction of turning of the pestle about its own axis. The universal joint 33, bearing 34, link 35, having slot-and-pin connection 36, with standard 29, and eccentric 37, on the counter shaft 30, impart gyratory motion to the pestle.

In use mercury is put into the cup 5, and the other ingredient is put into the cup 6, and the finger piece 38, is turned with the result that the feed plate 14, and its accessory plungers 10, distributer 12, and slide 21, measure the ingredients in the openings 17 and 18, which deliver them in measured quantities into the mortar 2. The hand crank 39, is turned with the result that the mortar 2, is turned in one direction and the pestle 26, and its stirrers 27 are turned in the opposite direction and also given a gyratory movement, all of which thoroughly mixes the ingredients and properly prepares the amalgam in the proportions desired ready for use and in the quantity required. By depressing the carrier 1, the mortar can be removed from its support for convenience in the use of the amalgam.

It will be obvious to those skilled in the art that modifications can be made in the described form of embodiment without departing from the spirit of the invention, hence the latter is not limited as to such matters or otherwise than the prior state of the art and the appended claims may require.

I claim:

1. An amalgam machine comprising the combination of a table, a mortar mounted to one side of the table and below the table top to receive material over the edge thereof and to provide space above for a pestle, cups for mercury and metal powder spaced above the table and having outlets through their bottoms and feed mechanism therefor, a feed-plate oscillatable between the cups and table and provided with openings alinable with the outlets and with the mortar, a pestle operative in said space, and means for operating the parts.

2. In an amalgam machine cup for mercury and metal powder spaced above the table and having outlets through their bottoms, feed plungers for the outlets, a rotary distributer for the metal powder cup, a feed plate oscillatable between the cups and table and provided with openings alinable with the outlets and positionable over the edge of the table top, a reciprocating slide on said feed plate and of which one end constitutes a wall of the opening for mercury, and means for actuating said parts, substantially as described.

ALFRED G. WRIGHT.